US012670524B2

(12) United States Patent
Elmoznino et al.

(10) Patent No.: US 12,670,524 B2
(45) Date of Patent: Jun. 30, 2026

(54) MACHINE IMAGE COLOUR EXTRACTION AND MACHINE IMAGE CONSTRUCTION USING AN EXTRACTED COLOUR

(71) Applicant: L'Oreal, Paris (FR)

(72) Inventors: Eric Elmoznino, Toronto (CA);
Parham Aarabi, Richmond Hill (CA);
Yuze Zhang, Scarborough (CA)

(73) Assignee: L'Oreal, Paris (FR)

( * ) Notice: Subject to any disclaimer, the term of this patent is extended or adjusted under 35 U.S.C. 154(b) by 520 days.

(21) Appl. No.: 17/869,942

(22) Filed: Jul. 21, 2022

(65) Prior Publication Data

US 2022/0351416 A1 Nov. 3, 2022

Related U.S. Application Data

(62) Division of application No. 16/854,975, filed on Apr. 22, 2020, now Pat. No. 11,461,931.

(Continued)

(51) Int. Cl.
*G06V 10/56* (2022.01)
*G06N 3/08* (2023.01)
(Continued)

(52) U.S. Cl.
CPC ........... *G06Q 30/0643* (2013.01); *G06N 3/08* (2013.01); *G06T 7/90* (2017.01); *G06T 11/10* (2026.01);
(Continued)

(58) Field of Classification Search
CPC ..... G06Q 30/0643; G06T 7/90; G06T 11/001; G06T 2207/10024; G06T 2207/20081;
(Continued)

(56) References Cited

U.S. PATENT DOCUMENTS

| | | |
|---|---|---|
| 8,638,474 B2 | 1/2014 | Nakajima |
| 10,755,228 B1 | 8/2020 | Hasan |

(Continued)

FOREIGN PATENT DOCUMENTS

| | | | |
|---|---|---|---|
| BE | 1022821 B1 * | 9/2016 | ............... G01J 3/52 |
| BR | 102012033722 A2 | 5/2015 | |

(Continued)

OTHER PUBLICATIONS

E. Skodras and N. Fakotakis, "An unconstrained method for lip detection in color images," 2011 IEEE International Conference on Acoustics, Speech and Signal Processing (ICASSP), Prague, Czech Republic, 2011 (Year: 2011).*

(Continued)

*Primary Examiner* — Vu Le
*Assistant Examiner* — Zaid Muhammad Saleh
(74) *Attorney, Agent, or Firm* — Christensen O'Connor Johnson Kindness PLLC

(57) ABSTRACT

Provided are systems and methods to perform colour extraction from swatch images and to define new images using extracted colours. Source images may be classified using a deep learning net (e.g. a CNN) to indicate colour representation strength and drive colour extraction. A clustering classifier is trained to use feature vectors extracted by the net. Separately, pixel clustering is useful when extracting the colour. Cluster count can vary according to classification. In another manner, heuristics (with or without classification) are useful when extracting. Resultant clusters are evaluated against a set of (ordered) expected colours to determine a match. Instances of standardized swatch images may be defined from a template swatch image and respective extracted colours using image processing. The extracted colour may be presented in an augmented reality GUI such (Continued)

as a virtual try-on application and applied to a user image such as a selfie using image processing.

19 Claims, 7 Drawing Sheets

Related U.S. Application Data

(60) Provisional application No. 62/837,368, filed on Apr. 23, 2019.

(51) Int. Cl.

| | | |
|---|---|---|
| *G06Q 30/0601* | (2023.01) | |
| *G06T 7/90* | (2017.01) | |
| *G06T 11/10* | (2026.01) | |
| *G06V 10/40* | (2022.01) | |

(52) U.S. Cl.
CPC .............. *G06V 10/40* (2022.01); *G06V 10/56* (2022.01); *G06T 2207/10024* (2013.01); *G06T 2207/20081* (2013.01); *G06T 2207/20084* (2013.01)

(58) Field of Classification Search
CPC .......... G06T 2207/20084; G06V 10/40; G06V 10/56; G06V 10/762; G06V 10/764; G06N 3/045; G06F 18/23; G06F 18/241
See application file for complete search history.

(56) References Cited

U.S. PATENT DOCUMENTS

| | | | |
|---|---|---|---|
| 2004/0239968 A1 | 12/2004 | Gondek | |
| 2018/0018937 A1 | 1/2018 | Yu | |
| 2018/0075524 A1* | 3/2018 | Sartori Odizzio | G06Q 30/0643 |
| 2019/0014884 A1* | 1/2019 | Fu | G06T 1/0007 |
| 2019/0066338 A1* | 2/2019 | Perlman | G06K 19/0614 |

FOREIGN PATENT DOCUMENTS

| | | | | | |
|---|---|---|---|---|---|
| CN | 101517616 A | * | 8/2009 | | G06V 10/56 |
| CN | 107194348 A | * | 9/2017 | | G06V 20/00 |
| CN | 113052194 A | | 6/2021 | | |
| JP | 2010-250726 A | | 11/2010 | | |
| JP | 2014-197358 A | | 10/2014 | | |
| WO | WO-2006109879 A1 | | 10/2006 | | |

OTHER PUBLICATIONS

E. Skodras and N. Fakotakis, "An unconstrained method for lip detection in color images," 2011 IEEE International Conference on Acoustics, Speech and Signal Processing (ICASSP), Prague, Czech Republic (Year: 2011).*

Cho_PaletteNet_Image_Recolorization_CVPR_2017_paper (Year: 2017).*

Wikipedia definition "k-means clustering" (Year: 2018).

Toyota, S, I Fujiwara, M Hirose, N Ojima, K Ogawa-Ochiai, N Tsumura. "Principal Component Analysis for the Whole Facial Image With Pigmentation Separation and Application to the Prediction of Facial Images at Various Ages." The Journal of imaging science and technology 58,No. 2(2014): 20503-1-20503-11. (Year: 2014).

Nishimura, Ayana, and Itiro Siio. "iMake: Eye Makeup Design Generator." In Proceedings of the 11th Conference on Advances in Computer Entertainment Technology, 1-6. ACM, 2014. (Year: 2014).

Combined European Office Action and Search Report issued Dec. 14, 2023 in European Application No. 20 722 513.7, 8 pgs.

Japanese Office Action issued Nov. 28, 2023 in Japanese Application No. 2021-563377 with English translation, 8 pgs.

Skodras et al: "An unconstrained method for lip detection in color images", 2011 IEEE Nternational Conference on Acoustics, Speech and Signal Processing: (ICASSP 2011); Prague, Czech Republic, May 22-27, 2011, IEEE, Piscataway, NJ, May 22, 2011 (May 22, 2011), pp. 1013-1016.

Vincent et al: "A self-adaptive k-means classifier for business incentive in a fashion design environment", Applied Computing and Informatics, vol. 14, No. 1, Jan. 31, 2018 (Jan. 31, 2018), pp. 88-97.

Cho et al: "PaletteNet: Image Recolorization with Given Color Palette", 2017 IEEE Conference on Computer Vision and Pattern Recognition Workshops (CVPRW), IEEE, Jul. 21, 2017 Jul. 21, 2017), pp. 1058-1066.

* cited by examiner

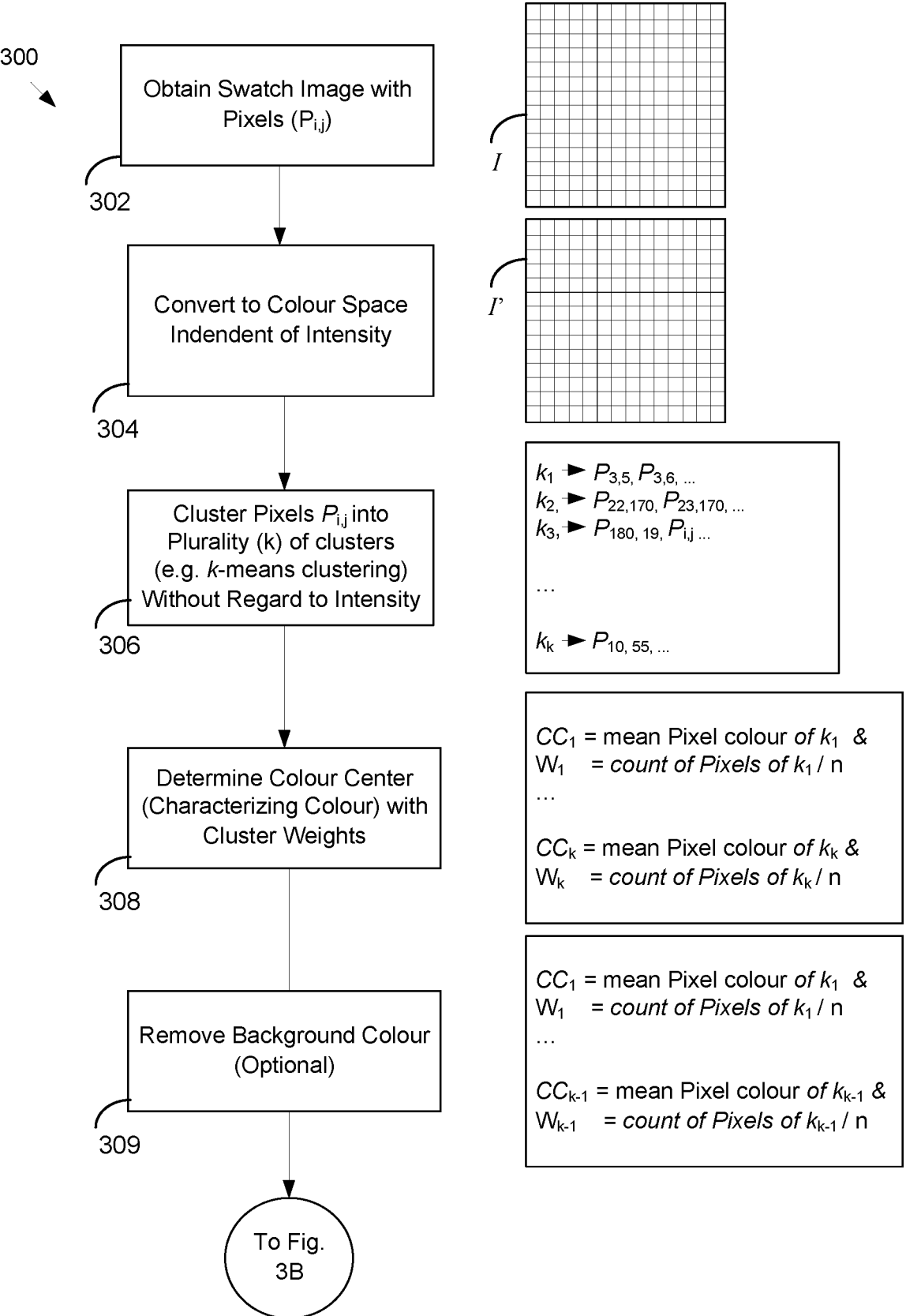

300

Obtain Swatch Image with Pixels ($P_{i,j}$)

302

$I$

Convert to Colour Space Indendent of Intensity

304

$I'$

Cluster Pixels $P_{i,j}$ into Plurality (k) of clusters (e.g. $k$-means clustering) Without Regard to Intensity

306

$k_1$ ➤ $P_{3,5}, P_{3,6}, ...$
$k_2,$ ➤ $P_{22,170}, P_{23,170}, ...$
$k_3,$ ➤ $P_{180, 19}, P_{i,j} ...$

...

$k_k$ ➤ $P_{10, 55}, ...$

Determine Colour Center (Characterizing Colour) with Cluster Weights

308

$CC_1$ = mean Pixel colour *of $k_1$* &
$W_1$    = *count of Pixels of $k_1$* / n
...

$CC_k$ = mean Pixel colour *of $k_k$* &
$W_k$    = *count of Pixels of $k_k$* / n

Remove Background Colour (Optional)

309

$CC_1$ = mean Pixel colour *of $k_1$* &
$W_1$    = *count of Pixels of $k_1$* / n
...

$CC_{k-1}$ = mean Pixel colour *of $k_{k-1}$* &
$W_{k-1}$    = *count of Pixels of $k_{k-1}$* / n

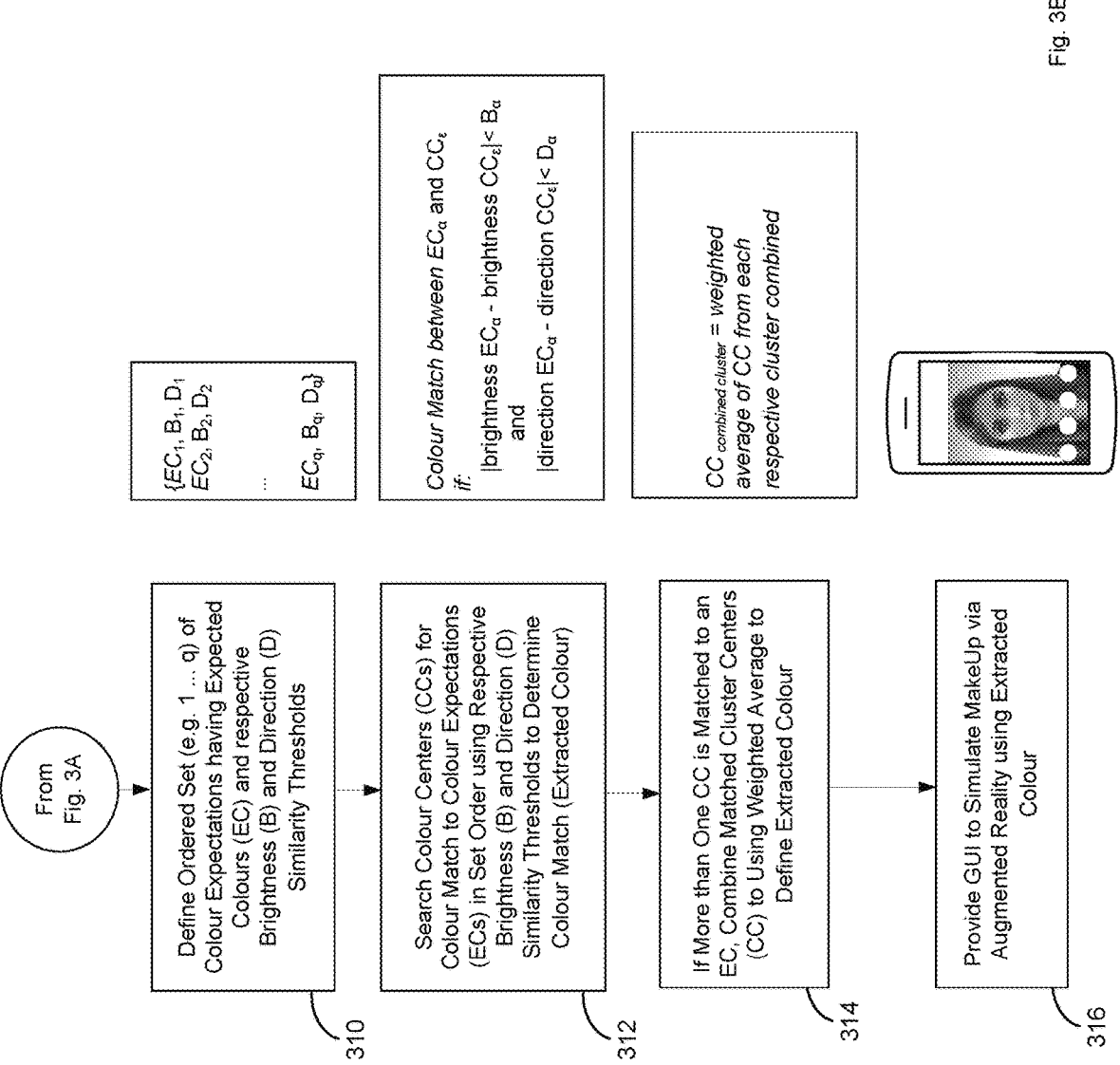

$\{EC_1, B_1, D_1$
$EC_2, B_2, D_2$
...
$EC_q, B_q, D_q\}$

Colour Match between $EC_\alpha$ and $CC_\epsilon$
if:
$|\text{brightness } EC_\alpha - \text{brightness } CC_\epsilon| < B_\alpha$
and
$|\text{direction } EC_\alpha - \text{direction } CC_\epsilon| < D_\alpha$ $CC_{combined\ cluster} = weighted\ average\ of\ CC\ from\ each\ respective\ cluster\ combined$ From
Fig. 3A Define Ordered Set (e.g. 1 ... q) of Colour Expectations having Expected Colours (EC) and respective Brightness (B) and Direction (D) Similarity Thresholds

310

Search Colour Centers (CCs) for Colour Match to Colour Expectations (ECs) in Set Order using Respective Brightness (B) and Direction (D) Similarity Thresholds to Determine Colour Match (Extracted Colour)

312

If More than One CC is Matched to an EC, Combine Matched Cluster Centers (CC) to Using Weighted Average to Define Extracted Colour

314

Provide GUI to Simulate MakeUp via Augmented Reality using Extracted Colour

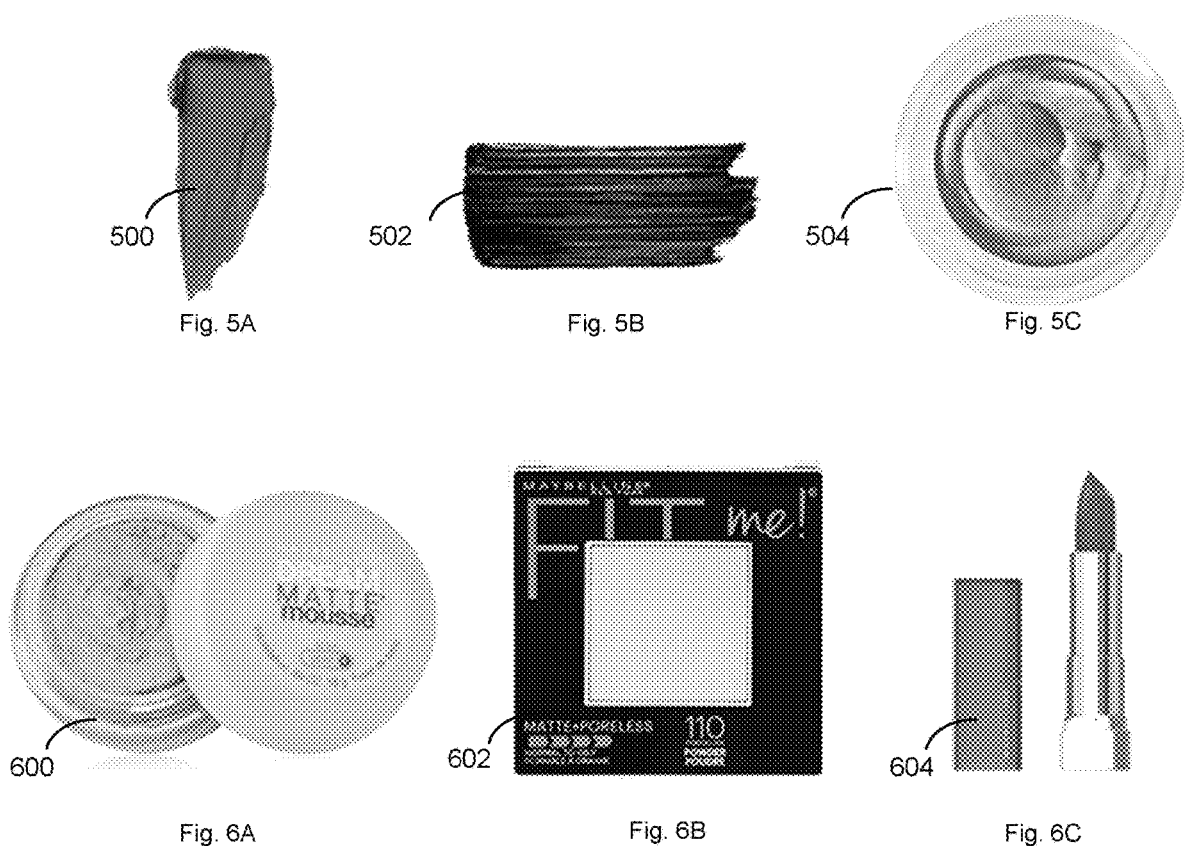
500
Fig. 5A
502
Fig. 5B
504
Fig. 5C
600
Fig. 6A
602
Fig. 6B
604
Fig. 6C
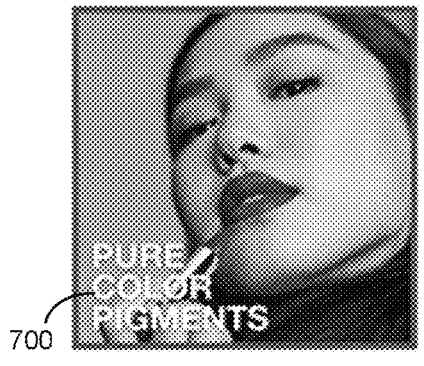
700
Fig. 7A
DOUBLE
EXTEND
✓ LONGWEARING
✓ SMUDGE-PROOF
702
✓ EASY REMOVAL
Fig. 7B

MACHINE IMAGE COLOUR EXTRACTION AND MACHINE IMAGE CONSTRUCTION USING AN EXTRACTED COLOUR

CROSS-REFERENCE

The application is a division of and claims the benefit of priority under 35 U.S.C. § 120 from U.S. application Ser. No. 16/854,975 filed Apr. 22, 2020, and claims the benefit of priority from U.S. Provisional Application No. 62/837,368 filed Apr. 23, 2019, the entire contents of each of which are incorporated herein by reference.

FIELD

The following relates to image processing such as for machines and more particularly to colour extraction from images such as swatches and to colour image construction using an extracted colour.

BACKGROUND

Swatches are small samples of products intended to display a look of the product. One feature of the look that may be of interest is colour.

In a machine environment, a swatch is typically presented as an image. In some examples the image may be comprised entirely of the swatch and in some examples a portion of the image may contain the swatch, for example, in a region of interest.

Although sighted humans can usually identify a colour from arbitrary swatches with ease, doing so programmatically for a machine is a difficult task that remains unsolved. In addition to extracting colour, it may be desired to apply or otherwise use an extracted colour to construct a new image. In some examples a new image is constructed such as by applying the extracted colour to a surface of an object in the new image.

SUMMARY

Provided are systems and methods to perform colour extraction from swatch images and to define new images using extracted colours. Source images may be classified using a deep learning net (e.g. a CNN) to indicate colour representation strength and drive colour extraction. A clustering classifier is trained to use feature vectors extracted by the net. Separately, pixel clustering is useful when extracting the colour. Cluster count can vary according to classification. In another manner, heuristics (with or without classification) are useful when extracting. Resultant clusters are evaluated against a set of (ordered) expected colours to determine a match. Instances of standardized swatch images may be defined from a template swatch image and respective extracted colours using image processing. The extracted colour may be presented in an augmented reality GUI such as a virtual try-on application and applied to a user image such as a selfie using image processing.

In practice, there is a diversity of swatch images styles or types for a same type of product that results in colour being presented in different manners in the different styles. As such, in some swatch image styles, the product colour may be more challenging to identify in a particular swatch image. Diverse images (of a same product type) may be handled using clustering techniques applied to feature vectors of the images. The feature vector clustering technique may be used in a classifier to determine how strongly a particular swatch image represents the product colour. The classifier may assign (label) a particular swatch image one of 3 classes such as strong, weak and ignored. Labelled swatch images may be processed respectively and using the colour extraction operations comprising the image pixel clustering technique. Those labelled ignored may be ignored. Those labelled strong may be processed to identify a single product colour. Images labelled as weak may be processed using the image pixel clustering technique to identify candidate product colours, such as three candidate colours. Manual selection may resolve a single product colour from the candidate colours.

Instances of standardized swatch images may be defined from a template swatch image and respective extracted colours by using image processing. The extracted colour may be presented in an augmented reality graphical user interface (GUI) such as a virtual try-on application and applied to a user image, such as a selfie, using image processing.

In one aspect there is provided a method comprising: classifying a source colour image showing a colour of an item of interest to indicate a strength of a representation of the colour in the source colour image, the classifying using a deep learning network model to extract image features with which to determine the strength; extracting colour information from the source colour image, responsive to the classifying, by clustering pixels of the source colour image in accordance with respective colours of the pixels and identifying at least one candidate colour as the extracted colour in response to the clustering of the pixels; and providing the extracted colour to define a new image using image processing.

Classifying may identify the source colour image as strongly representing the colour. Extracting colour information thus responsively produces one candidate colour from a dominant colour identified by the clustering of pixels. Classifying may identify the source colour image as weakly representing the colour. Extracting colour information thus responsively produces a plurality of candidate colours identified by the clustering of pixels.

Classifying may use a cluster-based classification responsive to image feature vectors extracted by the deep learning network model.

Clustering pixels may define a number of clusters k from which to determine the at least one candidate colour, which number k varies in response to the classifying.

Classifying may perform a cluster-based classification that: measures an image feature vector for the source colour image produced by the deep learning network model against a plurality of image feature clusters; and provides, as a classification of the source colour image, a respective class associated with one of the plurality of image feature clusters that is nearest to the image feature vector for the source colour image, the respective class indicating the strength of representation of colour. The plurality of image feature clusters may be generated from training data comprising training images showing colour processed by the deep neural network model to produce image features vectors with which to define the plurality of image feature clusters. Each of the training images is thus respectively assigned to one of the respective classes indicating the strength of representation of colour.

The network model may comprises a convolutional neural network (CNN) pretrained to process images of objects to define feature vectors for the images of objects.

The method may comprise acquiring a starting image with which to define the new image and defining the new image from the starting image using the extracted colour to apply to an object for display within the new image. The starting image may comprises a first selfie image, the new image comprises a new selfie image including the object and the object comprises a product for simulation on the first selfie image. The product may comprises a makeup product to virtually try on using augmented reality and the source colour image comprises a swatch image of a makeup product. The method may comprise presenting the new image in a graphical user interface (GUI) providing a makeup product to virtually try on using an augmented reality experience, the GUI further configured to: receive a selfie image of a user and a selection of the new image and apply the extracted colour to a portion of the selfie image to virtually try on the makeup product as represented by the new image.

In one aspect, there is provided a computing machine comprising: a processor coupled to a storage device, the storage device storing instructions, which when executed by the processor, configure the computing machine to: obtain a source colour image comprising pixels, the source colour image having a region with a colour to be extracted; cluster the pixels without regard to intensity into a plurality of clusters each cluster of the plurality characterized by a respective characterizing colour; evaluate the plurality of clusters against a set of colour expectations comprising respective expected colours to be present in the image, using the expected colours to search the plurality of clusters for a colour match to define the extracted colour; and provide the extracted colour to define a new image using image processing.

To cluster the pixels may comprise applying k-means clustering to the pixels without regard to intensity.

The pixels may be defined in a first colour space and the instructions may configure the computing machine to convert the pixels to a second colour space that is intensity independent. The first colour space may comprise Red Green Blue (RGB) colour space or an equivalent. The second colour space may comprise a Lightness (L), green-red (a), blue-yellow (b) (LAB) colour space or an equivalent.

To search for the colour match may comprise determining a similarity of the respective characterizing colour of one of the plurality of clusters with a respective expected colour of one of the set of colour expectations. The search may locate the colour match when the respective characterizing colour is similar to the respective expected colour in both a brightness and a direction in accordance with respective threshold requirements for the respective expected colour. The instructions may configure the computing machine to determine the colour match by: (a) computing a brightness difference between the brightness of the characterizing colour and the brightness of the respective expected colour and comparing the brightness difference to a brightness difference threshold of the respective threshold requirements for the respective expected colour; and (b) computing a direction difference between a cosine angle of the direction of the characterizing colour and a cosine angle of the direction of the respective expected colour and comparing the direction difference to a direction difference threshold of the respective threshold requirements for the respective expected colour.

The computing machine may define the set of colour expectations as an ordered set in accordance with a priority order. To evaluate may comprise searching the set of colour expectations using the plurality of clusters in accordance with the priority order, stopping when the colour match is located.

The instructions may configure the computing machine to: combine two or more clusters of the k clusters into a combined cluster if each of the two or more clusters provides a colour match in response to a search; and use the combined cluster to define the extracted colour.

The instructions may configure the computing machine to acquire a starting image with which to define the new image and define the new image from the starting image using the extracted colour to apply to an object for display within the new image. The starting image may comprise a first selfie image and the new image may comprise a new selfie image including the object. The object may comprise a product for simulation on the first selfie image. The computing machine may comprise a mobile device and the product may comprise a makeup product to virtually try on using augmented reality.

The source colour image may comprise a swatch image of a makeup product.

The new image may comprise a standardized swatch image defined from a template image and the extracted colour. The instructions may configure the computing machine to present the new image in a GUI providing a makeup product to virtually try on using an augmented reality experience. The GUI may be further configured to: receive a selfie image of a user and a selection of the new image and apply the extracted colour of the new image to a portion of the selfie image to virtually try on the makeup product as represented by the new image.

For any of the method aspects a computing machine and computer programme product aspect will be apparent. Similarly for any of the computing machine aspects a method and computer programme product aspect will be apparent. Other aspects will also be apparent.

BRIEF DESCRIPTION OF THE DRAWINGS

FIGS. 3A and 3B a flowchart of operations for machine colour extraction and colour image generation using an extracted colour in accordance with an example and also showing data structures.

FIGS. 5A-5C, 6A-6C and 7A-7B show diverse swatch images classified in accordance with a strength of product colour representation in which: FIGS. 5A, 5B and 5C are classified as showing strong product colour representation; FIGS. 6A, 6B and 6C are as classified as showing weak product colour representation; and FIGS. 7A and 7B are classified as showing product colour representation which may be ignored.

Figure 1:
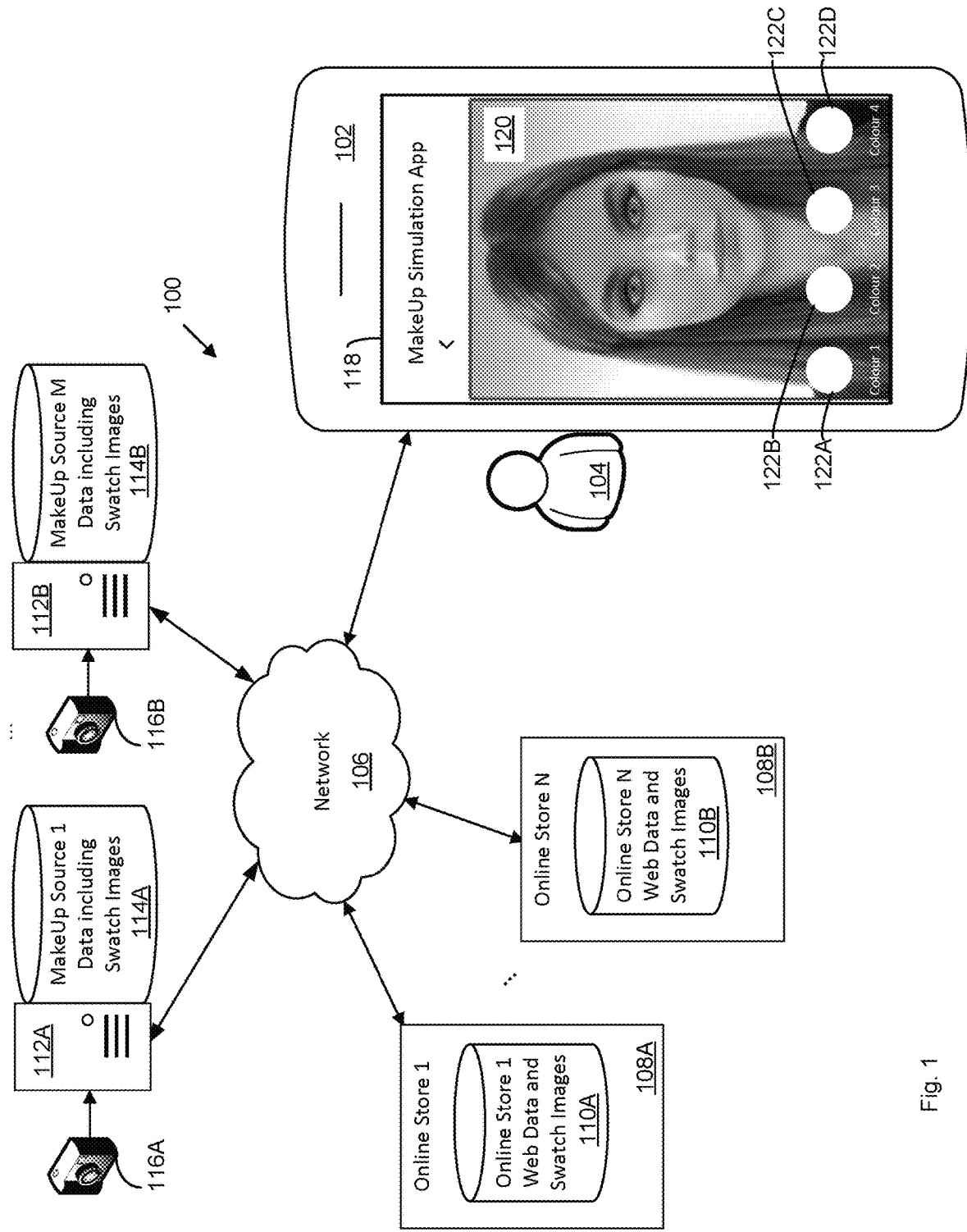
FIG. 1 is a block diagram of a machine environment for colour extraction and colour image generation using an extracted colour in accordance with an example.

The present inventive concept is best described through certain embodiments thereof, which are described herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light. More than one inventive concept may be shown and described and each may standalone or be combined with one or more others unless stated otherwise.

DETAILED DESCRIPTION

In a machine context, digital images comprise data in the form of pixels that typically relate to a physical point in a raster image. The intensity of each pixel is variable and in colour images, a colour is typically represented by three or four component intensities in accordance with a colour model (e.g. a data scheme). Pixel data is often defined using the RGB (red, green blue) color model. RGB is an additive colour model. RGB is often used for images from RGB input devices and for RGB output devices. RGB input devices include video cameras, image scanners and digital cameras. RGB output devices include various display screen devices (e.g. TV screens, and monitors including computer monitors and mobile phone displays of various technologies (e.g. CRT, LCD, plasma, OLED), video projectors, etc.) Other colour models include CMYK (cyan, magenta, yellow, key (black)) which is a subtractive colour model and is more often used in colour printing such as where ink is deposited on a substrate such a paper. Thus, in a machine context, images that are generally acquired from most sources for processing are at least initially defined according to the RGB color model.

The RGB colour model has alternative colour representations such as the HSL (hue, saturation, lightness) and HSV (hue, saturation and value) color spaces. Further colour spaces include CIELAB (International Commission on Illumination (CIE) Lightness (L) green-red (A) and blue-yellow (B)) colour space. CIELAB is also known as CIE L*a*b* and is sometimes abbreviated to LAB or Lab.

In a variety of industries including the beauty industry, swatch images are prevalent in online stores, and are often the only visual indication customers have of what the product will look like. Machine-based colour extraction, whereby colour is identified by extraction from arbitrary swatches programmatically, is a difficult task.

There are applications for which programmatic colour extraction from a swatch image is useful. Machine construction of a new image using an extracted colour is one such example. Augmented reality uses constructed images to give a virtual view of one or more objects, for example.

Virtual makeup try-on has become very popular within online beauty stores with the advancement of augmented reality. The methods of rendering virtual makeup require several pieces of information about the target product, most important of which is its colour. Currently, this problem is solved by manually creating large databases of products along with their corresponding colours and tuning those colour values until the virtually rendered result sufficiently resembles the real one. This process has several pitfalls. First, manually tweaking colour values is both time consuming and subjective. Second, the process may necessitate extensive coordination between the developers of the virtual try-on software and the makeup brands, which may be infeasible if the virtual try-on software is to be embedded in an online store that sells products from third-party retailers. Rather, shown herein is a solution that leverages swatch images that already exist for each of the products, programmatically extracting the colour directly from them in an unbiased and objective way.

Another general application of swatch colour extraction is in data collection. The ability to programmatically extract makeup colour from online swatch images or images of the makeup applied to people in the real world could have many benefits. The data collected could be used for fashion trend analytics, advertising popular shades, product recommendations based on a "look" in a user-selected image, metadata for more accurate online searches, etc.

Other uses in automatically extracting colour may include using the extracted colour as a proxy for localizing and tracking an object (or objects) in a series of frames. This could be useful in cases where have a large amount of data to train a neural network object tracker is not available. However, the more complex the object image (e.g. not a simple swatch), the less likely this method may be successful, since it assumes that there are only a few main colours used for such an object, as will be apparent from the approach described below.

Despite the many potential benefits, makeup colour extraction from swatches remains an unsolved problem for many reasons. (It is noted that the issue is not restricted to makeup but could be applied to other products such as paint colour for home or automobile, fabric color such as for decorating, etc. An extracted colour from a paint or fabric swatch may be used when constructing a 2D or 3D room where surfaces are coloured using the extracted colour or a colour derived therefrom. A colour derived therefrom may be a complementary colour.

The most popular approach for attempting to solve difficult computer vision tasks in recent years has been to use deep learning. One of the main pitfalls of deep learning, however, is the need for vast amounts of annotated data. Constructing such datasets is resource intensive. In a makeup context, no public dataset exists for automatic colour extraction from swatch images of makeup. Moreover, annotated datasets tend to be static and dated unless regularly updated such as to adopt new colours.

Another significant challenge for machine learning approaches, and a challenge for any method in general, is the very high variance in the distribution of swatch data. For instance, the distribution of swatch images in lipsticks alone includes images with the lipstick applied to a piece of paper, images with it applied to a patch of skin, images with it applied to lips, images with it and the cap off, and invalid images with it covered in its box, just to name a few. Every lipstick brand tends to have their own style of swatch images, which means that the variance scales with the number of brands sold on an online store, and the style also changes over time. This large variance makes it very difficult to develop a single solution that works reliably in the majority of cases.

Not only is the variance between image styles high, but the variance in colour distribution within images is as well. The swatches are rarely composed of a solid colour on a flat background. Rather, they often contain multiple colours spread out across the image, many of which could be possible colours (e.g. possible lipstick colours in a lipstick makeup image). Thus, a successful machine colour extraction method would seek to not only identify a principle colour palette in an image, but also have a robust way of selecting a correct colour amongst the colours in the image. By way of example, it may be imagined that there is a swatch of a lipstick that consists of an image comprising a lipstick case with its cap off and some writing (text) on a background. Finding the colour palette in this swatch might result in four colours: the colour of the lipstick, the colour of the case, the colour of the writing, and the colour of the background. These four primary colours in the image may define a palette for the image. The problem of finding the lipstick colour is not yet solved after extracting the four colour palette, because it remains unknown which of the colours corresponds to the actual lipstick. Solving this second problem is a goal of having a robust way of selecting the correct colour amongst the palette colours, where the word "correct" means the colour of the object of interest, (e.g. the lipstick, not the case).

Finally, the swatches are almost always real world images, meaning that the lighting conditions under which they are taken are never fully controlled. As a result, the colour in the image varies significantly in intensity between the well-lit regions and those in shadow. This makes it more difficult to both specify the correct intensity of the colour and to locate this colour in the first place, since there is no single RGB value that identifies the makeup within the image.

FIG. 1 is a block diagram of a machine environment for colour extraction and colour image generation using an extracted colour in accordance with an example. Mobile device 102 (an example of a computing machine) is shown in association with a user 104. Mobile device 102 (described further with reference to FIG. 2) may communicate such as via a browser or native application using Web techniques with one or more (e.g. N) online stores (Store 1 (108A) . . . Store N (108B)). The respective stores (Store 1 (108A) . . . Store N (108B)) are shown as computing machines such as one or more servers in association with respective online store data stores (e.g. databases 110A and 110B respectively) storing Web data and swatch images. It will be appreciated that these e-commerce environments are simplified. The N stores may receive product and other data including swatch data from a plurality (e.g. M) product sources. In the present example the product sources are makeup source 1 (112A) . . . makeup source M (112B) represented as computing machines such as one or more servers. Each of the product sources (makeup source 1 (112A) . . . makeup source M (112B)) is associated with a respective data store (e.g. databases 114A and 114B respectively) storing data such as product related data (descriptions, etc.) and swatch images. The M product sources may generate their respective product data, including swatch data such as from respective cameras 116A, 116B or other image generating devices. Typically the images are stored in a RGB colour space as described. It will be appreciated that these product sources are also simplified.

Each of the online stores and product sources may be associated with a legal entity operating a respective business. The respective computing machines may be operated by such entities or by others on their respective behalves (e.g. a services contact). The N online stores typically sells the products of others but may also sell their own products or white labelled products. The respective M product sources share (communicate) respective product data with the respective online stores that sell their products. Each of the N online stores may have on offer different product data and may have some of the same product data as another online store. The online stores may also originate their own product data including swatch images (not shown) or obtain same from others (third parties).

User device 102 comprises a display screen 118 such as for presenting GUI of an application. The application may be configured to virtually try on makeup. The GUI enables the taking of and presenting of a selfie image 120 and the selection of a colour (e.g. represented by icons, a type of GUI control) 122A, 122B, 122C and 122D of a makeup (e.g. lipstick) to be virtually applied to the selfie image 120. In some examples, the selfie image is a live image such as from a video to allow the user to turn their head (or move the camera or both actions) to view the look from different angles, and/or different light. Respective colours associated with the icons 122A, 122B, 122C and 122D may be determined from swatch images from respective on-line stores or other sources.

In the present example, display screen 118 is a gesture based (e.g. touch screen) enabled I/O device and a respective colour to try on may be selected by touching/swiping an icon representing the colour. Voice controls or other interfaces may be used (together or in the alternative). Other makeup, nail care, hair or other products may be virtually tried on.

Figure 2:
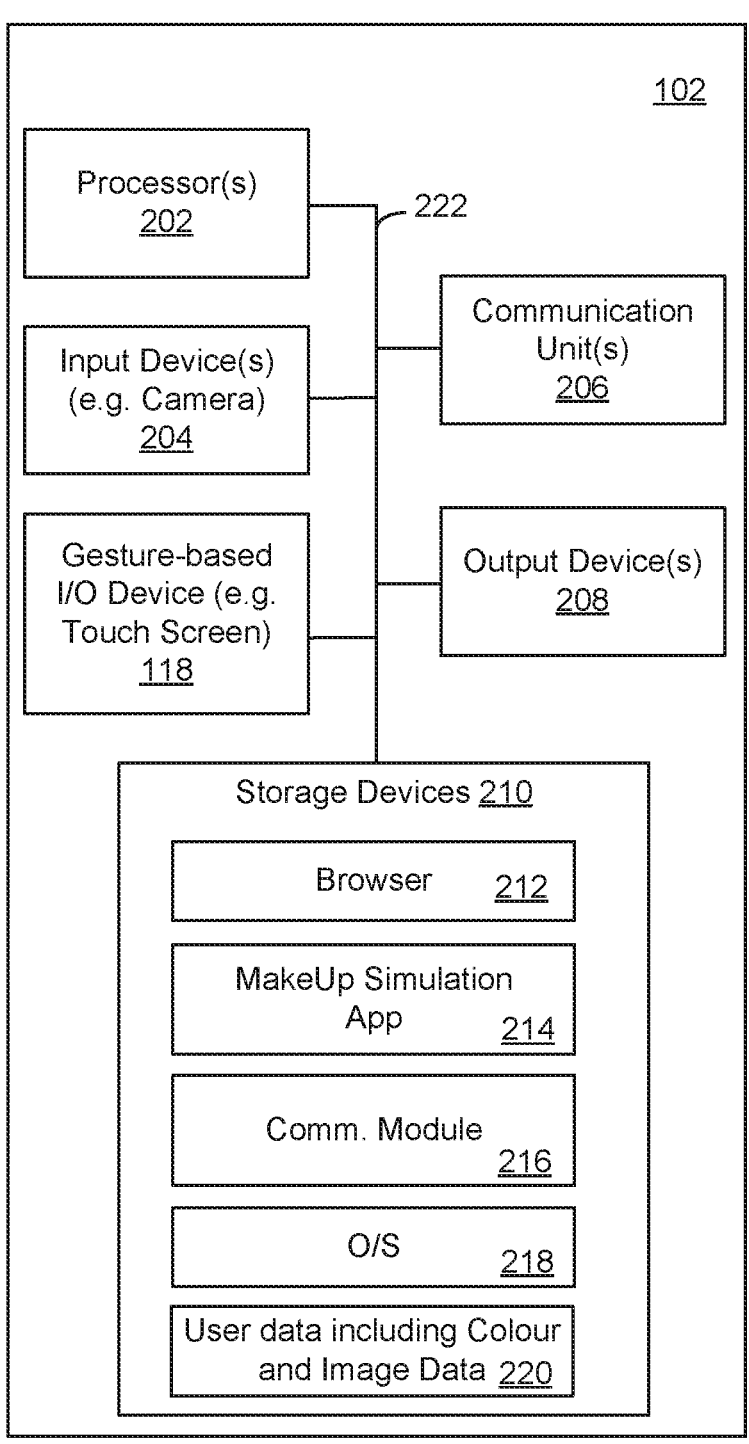
FIG. 2 is a block diagram of a representative computing machine.

FIG. 2 is a block diagram of user device 102. User device 102 comprises one or more processors 202 (e.g. one or more CPUs, GPUs), ASICs, FPGAs, etc.), input devices 204 including a camera, one or more communication units 206 (e.g. for wired or wireless communication), one or more output devices 208 (e.g. a speaker, light, etc.), and a gestures-based I/O device such as a touch screen (display screen 118) to receive input and present output visually. User device 102 also comprises one or more storage devices 210 (e.g. memory, disks, etc.) to store data including a browser 212 for Web-based communication, a makeup simulation application 214 to virtually try on makeup and lower level functions such as communication module 216 to facilitate wired and/or wireless communication and an operating system 218. Also stored is user data such as colour and image data such as for selfie images, swatch images, web data, colours extracted from swatches, etc.

Though shown as a standalone or native application, the makeup simulation application 214 may be configured in other manners such as a web-based application. For example to run in a browser environment of a user computing device. Makeup simulation application 214 is configured to receive swatch images associated with respective products and extract colours for simulating the respective products on a selfie image in a virtual try on application. Though a selfie is typical, other images may be used. Makeup simulation application 214 receives a first image such as a selfie, determines a product and colour therefor to be applied and generates (e.g. using image processing techniques) a second image using the first image, the product and the colour to virtually try on the product.

Reference may be had to FIGS. 3A and 3B, where, in accordance with an aspect, method operations 300 extract makeup colour from a swatch image without the use of any training data or machine learning. The present methodology has been developed and tested for lipstick images in particular, although it could be extended or modified to work for other types of makeup and other types of products as well. At a high level, the method works by finding intensity-independent colour clusters and then picking the one most likely to correspond to the product (e.g. lipstick) according to a priority heuristic designed from prior expectation.

Operations initially obtain a swatch image (e.g. I) with pixels (e.g. $P_{ij}$) at step 302 and convert the image pixels from RGB space into an intensity-independent colour space (at 304) to define image I'. Conversion may not be performed if the image is not defined in RGB and is already defined in an intensity-independent colour space.

Candidate swatch images have a small number of colours. This is because the operations herein specify the number of colours that are expected, which number corresponds to the number of clusters specified when executing the k-means clustering. The colour of the product of interest must actually be present in the image (i.e. it can't be occluded). It will be readily understood that, to extract a colour, it must be in the image to begin with. Given these two constraints, the type of swatches that the operations process is quite diverse: for example, the types of swatches may include a smudge on a piece of paper, a product applied on a face (although it is more likely to work when cropped to the lips (e.g. a region where product is applied), reducing the number of colours), an image with a product container (e.g. a tube) exposed, etc. An example of an instance where operations may not be successful, absent preprocessing, may include a full-body picture of a person where all of their clothes, their hair, and the background is shown because this would just add too many colours to the source image to be able to confidently discern the lip colour. In such a case it may be indicated to pre-process an image to restrict the image to a portion where the colour to be extracted is located and other colours are minimized. Persons of skill in the art will be aware that preprocessing operations are available to locate an object of interest such as, for example, lips on a face.

Operations 300 may thus be defined taking into account some assumptions about the source images. In a present example, preprocessing is not undertaken and it is assumed that the data source is such that the constraints will be met in the vast majority of cases (e.g. on the basis that the source images being input to the operations correspond to lipstick product pictures from an e-commerce website, and therefore they will (almost) all be simple swatches).

Since the swatch images are taken under real lighting conditions, individual objects within the image can vary vastly in colour intensity. For this reason, attempting to cluster colours directly in RGB space often causes the same object colour to be split into multiple incorrect clusters. For instance, in a simple swatch image of a red lipstick applied to a piece of paper, clustering in RGB space might yield an incorrect dark red cluster from the section in shadow and another incorrect bright red cluster from the section with incident light and specular reflections. This would make it difficult to determine which cluster is closer to the true lipstick's colour, and the average between them is usually closer to the true colour regardless. In order to remedy this problem and find clusters in a more lighting-independent fashion, the image in RGB colour space is converted to the LAB colour space and the L channel, which encodes intensity (lightness) is disregarded.

While LAB defines its colour space with a specific intensity (lightness) channel, operations need not use LAB, however. Another option is to simply split RGB into two components 1) the colour ratios normalized to a constant total which would be the intensity independent part and 2) the sum of all the components which would be the intensity part. So, in short, LAB itself is not a requirement and another colour space may be used that permits scrutiny without regard to intensity (e.g. the colour components may be reviewed separately from intensity).

Operations at 306 cluster the colours using k-means clustering with random centres initialization (for example using a standard technique for such k-means clustering). k-means clustering is a method of vector quantization that aims to partition n observations into k clusters in which each pixel is assigned to a respective cluster with the nearest mean. In the current example, each of the $i \times j = n$ pixels $P_{ij}$ of the image may be partitioned using only a and b colour data values and without regard to L intensity/lightness values when the image is represented in the LAB colour space.

Once every pixel has been assigned to one of the k clusters according to the clustering technique (e.g. following convergence), the centre (mean) and weight of each cluster is computed, where the weight is the proportion of image pixels that are in the cluster (e.g. count of pixels in the cluster/n) (step 308). The mean serves as the cluster centre providing a characterizing colour (CC) for the cluster (e.g. a prototypical or characterizing pixel of the respective cluster of pixels). By clustering the colours, the principle colour components of the image are locatable in an unsupervised way, and it is almost always the case that one of these components corresponds to the correct lipstick colour. k-means clustering is an iterative process that utilizes starting centres and then improves them gradually. As a start, the centres are initialized by taking k random pixels. Other clustering methods can serve as a substitute. k-means is generally the most stable according to the literature and is relatively fast. One disadvantage is that it requires a specification of the number of expected clusters, which is one of the reasons that the operations 300 targets swatch images, which typically have few colours. In the present example, k=3.

In addition, operations at 309 remove a typical background image colour from consideration on the basis that the background colour is not likely a true lipstick colour. Operations review the k colours searching for a "white" cluster that is close to RGB=(255, 255, 255), and if found it is removed as a candidate colour for the product. This approach is taken on the basis that there is usually a background in typical swatch images, and it is almost certainly white. White is an atypical lipstick colour. Therefore, in almost all cases, even though operations extract k=3 clusters, one colour is removed to leave two clusters after filtering out the white background. This strategy (number of clusters and what to filter out) was designed with lipstick swatches in mind, however, and may be adapted or otherwise configured for other types of product swatches (e.g. paint) and their typical characteristics. A class driven color extraction approach which does not use heuristics is further described herein below.

The final generalized step is to predict which cluster centre corresponds to the correct colour. This is an ill-posed problem in general; however, leveraging prior expectations of a product's (e.g. lipstick) colour is a very effective heuristic. Lipsticks are not produced in random, evenly distributed colours. Rather, there are distinct patterns in which certain colours are more or less common. To this end, at step 310, a priority list (e.g. set) of 1 . . . q colour expectations (e.g. which may be referenced as "expected colours" (EC)) is defined. At 312 this list/set is evaluated (e.g. walked through sequentially), stopping if the EC is matched by one or more of the cluster centres as described further. The following description provides details about the definition of a colour expectation and the conditions under which a cluster centre satisfies it.

A colour expectation is simply a range of RGB values. Colours can be split into a combination of two components: 1) brightness/intensity and 2) relative magnitudes of the individual channels. The brightness is described by the length of an RGB vector, while the relative magnitudes are described by the direction of the vector. The qualitative interpretation of the brightness is self-explanatory, while the vector direction can be thought of as encoding what the colour is. For instance, the colour blue has a direction of [0, 0, 1] in RGB space while the colour red has a perpendicular direction of [1, 0, 0], and both colours can have varying degrees of brightness.

For a colour cluster centre to satisfy a given colour expectation, it meets requirements of similarity for both its brightness and its direction. The brightness difference is simply computed as the difference in magnitude between the cluster centre vector and the colour expectation vector, while the direction difference is computed as the difference in the cosine angle between the two vectors. Every colour expectation has different threshold requirements for both of these components e.g. a Brightness Difference Threshold (B) and Direction Difference Threshold (D). For instance, there is a wide range of red lipstick shades whereas purple lipsticks tend to be closer to a particular shade, so the red colour expectation has more relaxed brightness and direction thresholds.

In the present operations 300, the colour expectations are evaluated one by one sequentially and operations end once one or more of the cluster centres from the image meets a colour expectation's threshold requirements. The colour expectation list is static and ordered in descending order of prevalence within the lipstick market in order to minimize errors. For instance, the colour expectation "red" is probed before the colour expectation "green" because it is more likely that there could be a red lipstick with some green elsewhere in the image than the other way around (since green lipsticks are very rare to begin with).

When a single cluster centre matches (e.g. meets the threshold requirement for the color expectation) this colour is used as the extracted colour to represent the swatch colour and may be used as described further.

It is worth noting as well that in some cases multiple colour cluster centres might meet the same threshold requirements for a given colour expectation. In this case, the cluster centres are combined (e.g. step 314) in a weighted average depending on their relative pixels quantities within the image (these weight values are also computed in step 308). Thus, each of the cluster centres is compared to the colour expectation being evaluated. More than one cluster centre may match (as described previously) and these more than one cluster centres may be combined in a weighted average depending on their relative pixels quantities to define the extracted colour.

Finally, in the cases where no colour cluster centres meet the threshold requirements of any colour expectation and the list is exhausted, the cluster centre closest to "red" is assumed to be the lipstick colour, although the confidence of the prediction is necessarily low (not shown).

In the present example, a GUI may be provided via a mobile device (or other computing machine) to present a virtual try on or simulation of the makeup on a selfie or other image using an augmented reality approach (step 316).

The example method achieves a high degree of accuracy on a test set of 160 swatch images from online retailer product pages for a selected online store. The test set is composed of 100 "easy" images that were randomly selected and represent the true distribution of swatches on the online store, and 60 "hard" images that were specifically sought out for their unusual lipstick colours.

Ground truth RGB values for the images were created by manually annotating a bounding box on the lipstick region and averaging the pixels values inside. Accuracy was evaluated separately for both the direction of the predicted colour vector and the intensity. For colour vector direction, a successful extraction was defined as the predicted colour being within 8 degrees of cosine similarity of the ground truth vector. For the colour vector intensity, a successful extraction was defined as a difference of less than 20 between the predicted colour and the ground truth colour on a scale of 255 in greyscale colour space. Table 1 shows various accuracy measures:

| Image Subset | Direction Accuracy | Intensity Accuracy | Joint Direction and Intensity Accuracy |
|---|---|---|---|
| "Easy" images | 95% | 94% | 94% |
| "Hard" images | 88% | 85% | 82% |

On the "easy" test set, which represents the true distribution of swatches on the online store, accuracy was extremely high. In the "hard" test set, which represents corner cases and abnormal lipstick colours, accuracy diminished but still remained high. The true colour (direction and intensity) was detected correctly in nearly all cases. In fact, most errors came from images where it was impossible to extract the correct colour, such as examples where the lipstick was in a case, the lipstick had a cap on, or there were multiple lipsticks of different colour in the image.

Swatch images may show an item of interest (e.g. a product) in various manners or styles. How strongly each respective image represents the product colour may be useful to improve color extraction. Some styles may be more challenging than others to identify the product and extract the colour.

A network may be trained for processing respective swatch images, classifying the strength of colour representation, prior to executing operations that perform colour extraction. For example, the swatch image may be initially classified (e.g. using a deep learning classifier). Responsive to the classification, colour extraction operations are respectively performed to extract colour information from the swatch image. Colour operations extract colour information using an image pixel clustering technique (which may be k-means or a similar clustering technique) but without using heuristics.

The deep learning classifier may be configured to use a (separate) clustering technique that clusters in response to image features represented by image feature vectors. These feature vectors may be generated by applying deep learning techniques such as a convolutional neural network (CNN) trained to identify image features. The classifier is described further herein below.

Color extraction using heuristics may not scale well to all product types: for example, extracting while applying a heuristic that limits or skews the colour information toward a set of likely colour candidates for the product may not apply to all product types, particularly those with a wide and uniform distribution of colour. Lipstick colours are generally limited to a small palette range, dominated by red colours, compared to many other types of products that may be in any colour of the spectrum and more equally distributed. More scalable processing without heuristics supports more categories (product types) than a heuristics-based approach. In a make-up domain, other categories may include 'lipliner', 'foundation', 'concealer', 'blush', 'highlight', 'contour', 'eyeshadow', 'eyeliner', 'mascara', 'brow'. In principle, the method can be scaled to support different types of products, while HE only specifically supports lipstick because the heuristics need manual design.

A single classifier may be defined (e.g. a respective deep learning neural network may be trained) for all types of items (e.g. all product types). Any respective product may be represented by diverse swatch image types and a classifier may be trained using the diverse images to label (classify) the images to one of a plurality of classes. The classes may be defined in response to a strength of the representation of the colour of the product by the swatch image. A single classifier may be more convenient, rather than defining and/or using product specific (separate) classifiers. In this way, a single classifier and colour extraction tool or function may be defined and/or used across different products.

The approach does not assume the color heuristics of a specific product (i.e., it does not have a ranking for colors that look most likely to be the color of a lipstick).

Deep learning methods are used to identify features in respective images and cluster same. The respective clusters may be ranked in response to the representation of the product colour. The classifier is thus trained to rank or label each swatch image responsive to the feature vectors identified and clustered. In the examples herein the classifier is trained to classify a swatch image as "strong", "weak" or "ignore".

The classifier to classify the diverse swatch image types comprises a deep learning model (e.g. a neural network such as a CNN) that is configured and trained for the performance objective. It is often convenient to begin defining a new network with an existing CNN based model that is previously defined and pretrained to process images, a number of which models are publicly available. One example is ResNet-152, a deep residual learning network (i.e. Res Net) for image recognition, which may have a depth of up to 152 layers. ResNet-152 is described by K. He, X. Zhang, S. Ren, and J. Sun, in "Deep residual learning for image recognition," CoRR, vol. abs/1512.03385, 2015, which is incorporated herein by reference and is available at arXiv: 1512.03385 from Cornell University. ResNet is trained on publicly available image datasets such as ImageNet available from image-net.org operated by Stanford University and Princeton University.

To further refine the network model for the proposed objective of classifying swatch images in accordance with how strongly an image represents a product colour, the starting network model may be utilized to generate feature information (feature vectors, comprising data generated following analysis of an image by the neural network). Each vectors represents a characterization of a respective image, akin to a finger print. At training time, a dataset of random product swatch samples (images) is gathered. To train (define) a single classifier, the training data may comprise samples from multiple product types to ensure a breadth or diversity of data. The ResNet (i.e. the starting model) is applied to the dataset of random product swatch images to generate respective feature vectors in accordance with the deep learning applied by the network model. That is, the images are run through the pretrained ResNet-152 model to obtain the feature vectors for each image.

Extracting the feature vectors for each training image, similar to a finger print, may make it easier to define the ultimate classifier using clustering techniques than through other techniques such as configuring and training the ResNet as an end-to-end classifier for this objective.

The resultant feature vectors are clustered (e.g. using k-means clustering techniques), into a specific number (n) of clusters. In the present example, n=50. It is repeated here that this clustering process is different from that described for color extraction. Clustering in this classifier stage is clustering on image feature vectors. Clustering in the color extraction stage is clustering on image pixels.

Manual review and categorization is performed. Operators manually review each cluster and categorize each cluster into one of three classes: strong, weak and ignored, which classification is useful to drive color extraction operations.

FIGS. 5A-5C, 6A-6C and 7A-7B show diverse swatch images classified in accordance with a strength of product colour representation in which: FIGS. 5A, 5B and 5C are classified as showing strong product colour representation; FIGS. 6A, 6B and 6C are as classified as showing weak product colour representation; and FIGS. 7A and 7B are classified as showing product colour representation which may be ignored.

Strong clusters typically have images that are of color previewing function for a product. The image typically only has a white background and with product color displayed in easy-to-extract form. It could depict product packaging but the color preview is prominent and not occluded as per examples 500, 502 and 504 in FIGS. 5A, 5B and 5C.

Weak clusters typically have images that still show color of a product but it may contain more packaging which may occlude part of the color preview as per examples 600, 602 and 604 in FIGS. 6A, 6B and 6C.

Ignored clusters typically include anything that cannot be easily used for color extraction purposes. Some examples include product packaging without color displayed, displays of legal disclaimers or text, and images showing models wearing the products as per examples 700 and 702 in FIGS. 7A and 7B.

After clustering and sorting the feature vectors, respective centers of clusters are defined for each of the clusters as are their corresponding categories (strong, weak, ignore (or a similar classification, the specific terms/words or codes per se are not material)). A cluster centre is a mean of the cluster of grouped observations (where, in the present example, an observation is a feature vector) and it serves as a prototypical observation for the cluster. Future observations (e.g. a feature vector from a swatch image analyzed at inference time) are measured against the means, determining a closest mean (e.g. based on Euclidean distance) and thus an association with that respective cluster.

Figure 8:
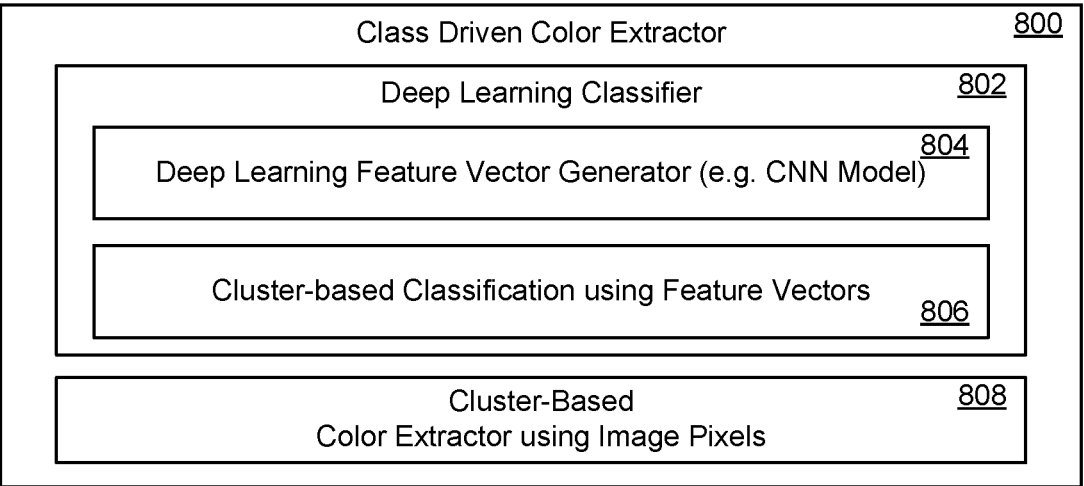
FIG. 8 is a block diagram of components of a class drive color extractor (e.g. in a memory or other storage device) of a computing machine.

FIG. 8 shows a block diagram of a class driven color extractor 800 for swatch images for a same product type in accordance with an embodiment. Class driven color extractor 800 comprises a deep learning classifier 802 having a deep learning feature vector generator 804 and a cluster based classification component 806 using the feature vectors. Class driven color extractor 800 also comprises a cluster-based color extractor component 808 that uses image pixels. It is understood that while components are shown separately, bright line distinctions may not exist and some components may be configured to perform multiple functions. Class driven color extractor 800 itself may be separated into more distinct components, such as into a classifier and a cluster-based color extractor using image pixels. Cluster-based color extractor component 808 may operate responsive to or be used responsive to the classification generated by deep learning classifier 802. That is, cluster-based color extractor component 808 may be provided the classification and return color information responsive to the classification. Alternatively, cluster-based color extractor component 808 may be provided only the image (a source colour image) and return candidate extracted colour information, which may be ordered (e.g. by strongest match), and other operations determine the extracted colour responsive to the class. For the ignored class generated for an image, no extracted colour may be extracted. It is expected that for most implementations in a commercial or practical environment, the extracted colour is a product colour.

Cluster-based color extractor component 808 may operate similarly as described with reference to FIGS. 3A and 3B. In the example of FIGS. 3A and 3B, a heuristic is used and at step 310 and following an ordered set of colours is evaluated. In the present example of FIG. 8, operations which compare clustered colours to an ordered set need not be performed. Cluster-based color extractor component 808 may be configured to use a small number of clusters for the colours using the understanding that an image that strongly represents the colour will have as its dominant color the product color. In a k-means cluster, for an image classified as strong k may equal 2 and when classified as weak may equal 5 when defining a number of colour clusters in the class driven colour extraction example, however, other values may be used.

The classifier may use pixel count per cluster as a metric for dominant colour. In weak classed images, the product colour may be a second or even a third color. More than one candidate colour may be generated and provided by cluster-based color extractor component 808, particularly for use with weak classified images.

Figure 9:
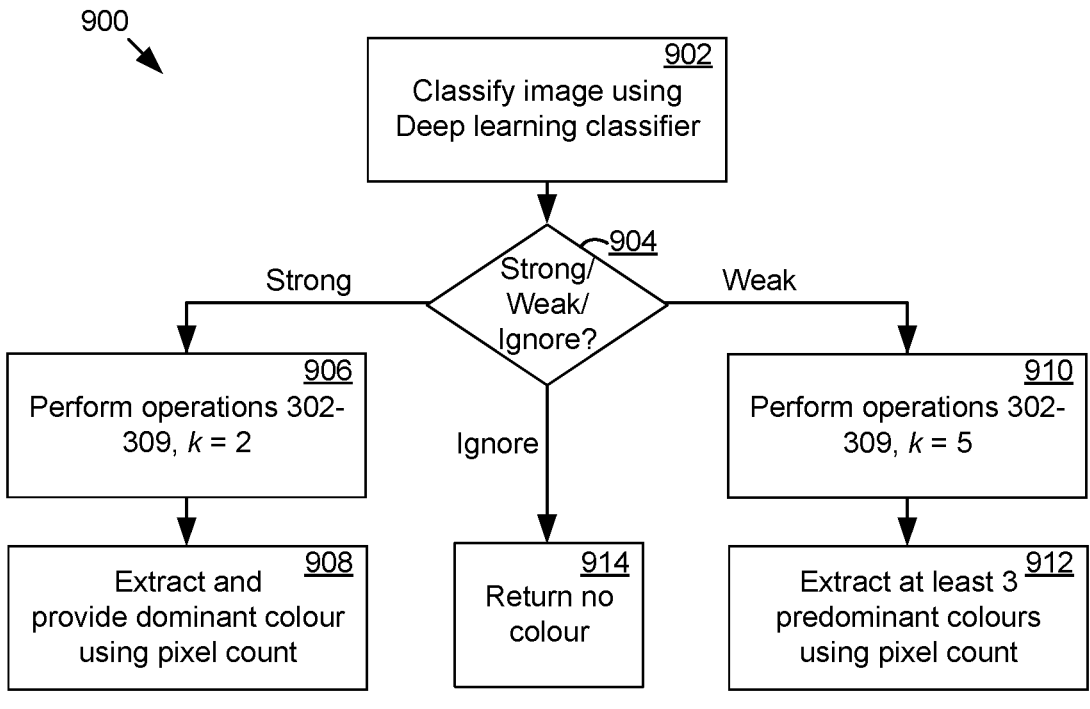
FIG. 9 is a flowchart of operations for class driven colour extraction.

In terms of modifications to operations 300 of FIGS. 3A and 3B, colour extraction that is driven by classification may proceed similarly but with replacements to operations 310-312. FIG. 9 shows operations 900 for class driven colour extraction for a respective source colour image (e.g. a swatch image). Further below are described operations when multiple images are available for a same item and colour.

At 902, the image is classified using the deep learning classifier (e.g. 802). A strong, weak or ignore class is obtained. As noted, other labels may be used. At 904 a decision is made (e.g. operations branch) based on the class. Via the strong branch to 904, operations 302-308, and optionally 309, from FIG. 3A are performed to process the image to cluster the pixels, preferably without regard to intensity. The number of clusters (k) may be 2 to help select the dominant colour. At step 906, the dominant colour is extracted using pixel count and returned.

Via the weak branch from 904, at step 910 operations 302-308, and optionally 309, from FIG. 3A are performed to process the image to cluster the pixels, preferably without regard to intensity. The number of clusters (k) may be 5 to help select the predominant colours. At 912 at least 3 predominant colours that are extracted using pixel count are returned. Via the ignore branch to 914, these operations return no colour.

Though not shown in FIG. 9, if batch classification is desired, the operations may be configured to receive a plurality of swatch images for a same item and same colour. Colour extraction is performed as shown using operations 900. If multiple strong images are processed and classified, the dominant colour from each strong image is averaged and returned. The weak images from a same batch may be ignored.

If no strong images are classified and weak images are classified, multiple predominant colours (e.g. a set of candidate colours) are returned. As each image may generate multiple candidate colours, similar colours from the multiple images may be used such as to order the colours or reduce the colour count based on commonalities. A manual process may be used to resolve the extracted colour in the weak case (e.g. presenting the plurality of colours and receiving a selection) or other approach may be utilized.

As noted, the source colour image processed may be an image where the item of interest therein is a product and the colour thereof is a product colour. Thus the extracted colour or plurality of candidate colours is the product colour. The extracted colour may be used, such as using image processing techniques, to define a new image that incorporates the colour. The product may be a makeup product and the new image may be a simulation of product use.

As noted, makeup simulation application 214 receives a first image such as a selfie, determines a product to be virtually tried on and a colour therefor from a swatch image. Colour data may be extracted and provided to the makeup simulation application such as from a computing machine in communication with user device 102 or user device 102 may be configured to determine the color data. The product swatch may be provided to a class driven color extractor (e.g. 800) and a colour returned or the product swatch may be analyzed by a component using a clustering based approach and heuristics such as shown in operations of FIGS. 3A and 3B to obtain a colour.

Makeup simulation application 214 generates (e.g. using image processing techniques) a second image using the first image, the product and the colour to virtually try on the product. The second image is presented such as via display screen 118. In another example, a user device may be configured to communicate the image to a remote computing machine along with a selection of a product and colour and receive the second image (showing the virtual application of the product) in return. An example of a makeup simulation application for a user device such as a tablet, smartphone (mobile device), etc. is ModiFace Live™ available from Modiface Inc.

In another use example, it may be desired to present different product colours in a standardized manner, for example, to present candidate lipstick colours as a smear where each smear is represented as a template image of a smear of lipstick having a same texture, lightness and other characteristics. Different instances of the lipstick smear image may be generated from the template image using a respective colour as determined by swatch colour extraction from respective swatch images. In this way, different swatches from different product lines and/or different product producers, etc. (as an example) may be presented in a standard or consistent manner. In one manner, operations of a computing device may perform swatch colour extraction such as described with reference to FIGS. 3A and 3B to determine an extracted colour. In one manner, the components of FIG. 8 may be used based on class driven color extraction.

Figure 4A:
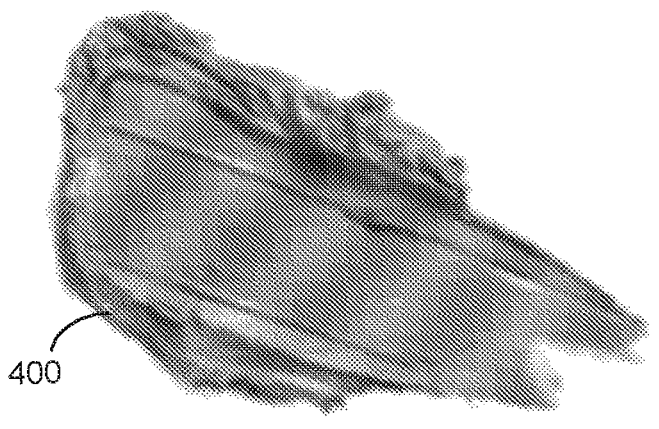
FIG. 4A shows a template smear image in a first colour and FIG. 4B shows an instance of a standardized swatch image updated from the image of FIG. 4A in a second colour.
Figure 4B:
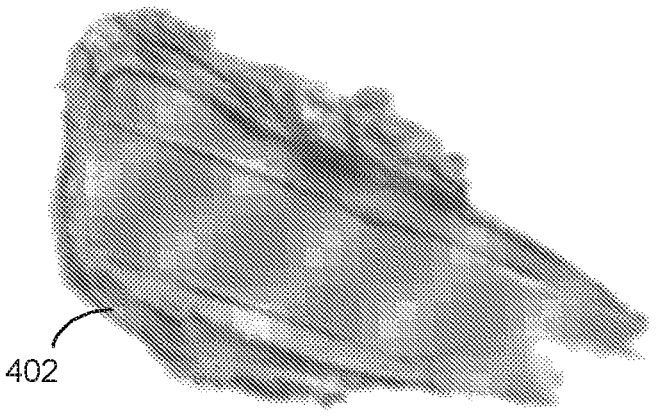

A template image may be obtained. Image processing may be performed to define an instance of a standardized swatch using the template image as updated with the extracted colour (e.g. replacing any colour in the template as applicable). FIG. 4A shows a template smear image 400 in a first colour (e.g. a red colour) and FIG. 4B shows an instance of a standardized swatch image 402 updated from image 400 in a second colour (blue). The images 400 and 402 are representative and depicted in a greyscale herein. They are not actually shown in colour but the effect thereof will be understood to a person of skill in the art. The instance 402 may be used in a GUI such as at 122A of FIG. 1 or in another manner. The instance 402 may be stored (e.g. to a data store 3.g. 110A, 110B or another (not shown)) or generated "on the fly" for the GUI. Operations to generate the instance may be performed by or on behalf of device 102.

In addition to computing device aspects, a person of ordinary skill will understand that computer program product aspects are disclosed, where instructions are stored in a non-transient storage device (e.g. a memory, CD-ROM, DVD-ROM, disc, etc.) to configure a computing device to perform any of the method aspects stored herein.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise. The term "and/or", for example, in relation to "A and/or B" herein means one of A, B and both A and B.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

What we claim is:

1. A method comprising:
   classifying a source colour image showing a colour of an item of interest to indicate a strength of a representation of the colour in the source colour image, the classifying using a deep learning network model to extract image features with which to determine the strength, the source colour image being a swatch image of a makeup product applied to a background object and having varying intensity;
   extracting colour information from the source colour image, responsive to the classifying, by clustering pixels of the source colour image in accordance with respective colours of the pixels and independent of intensity in the source colour image, and identifying at least one candidate colour as the extracted colour in response to the clustering of the pixels, wherein a number of clusters k from which to determine the at least one candidate colour is defined in response to the classifying of the strength; and providing the extracted colour to define a new image using image processing, the image processing using the extracted colour to simulate the colour of the item of interest in the new image.

2. The method of claim 1, wherein classifying identifies the source colour image as strongly representing the colour and wherein extracting colour information responsively produces one candidate colour from a dominant colour identified by the clustering of pixels.

3. The method of claim 1, wherein classifying identifies the source colour image as weakly representing the colour and wherein extracting colour information responsively produces a plurality of candidate colours identified by the clustering of pixels.

4. The method of claim 1 wherein classifying uses k-means a cluster-based classification.

5. The method of claim 1, wherein the item of interest is a product and the source colour image comprises a product swatch image advertising the product.

6. The method of claim 1, wherein classifying performs a cluster- based classification that:
   measures an image feature vector for the source colour image produced by the deep learning network model against a plurality of image feature clusters; and
   provides, as a classification of the source colour image, a respective class associated with one of the plurality of image feature clusters that is nearest to the image feature vector for the source colour image, the respective class indicating the strength of representation of colour.

7. The method of claim 6, wherein the plurality of image feature clusters are generated from training data comprising training images showing colour processed by the deep neural network model to produce image features vectors with which to define the plurality of image feature clusters and wherein each of the training images is respectively assigned to one of the respective classes indicating the strength of representation of colour.

8. The method of claim 1, wherein the network model comprises a convolutional neural network (CNN) pretrained to process images of objects to define feature vectors for the images of objects.

9. The method of claim 1 comprising acquiring a starting image with which to define the new image and defining the new image from the starting image using the extracted colour to apply to an object for display within the new image.

10. The method of claim 9, wherein the starting image comprises a first selfie image, the new image comprises a new selfie image including the object and the object comprises a product for simulation on the first selfie image.

11. The method of claim 10, wherein the product comprises a makeup product to virtually try on using augmented reality.

12. The method of claim 11 comprising presenting the new image in a graphical user interface (GUI) providing a makeup product to virtually try on using an augmented reality experience, the GUI further configured to: receive a selfie image of a user and a selection of the new image and apply the extracted colour to a portion of the selfie image to virtually try on the makeup product as represented by the new image.

13. A computing machine comprising a processor coupled to a storage device, the storage device storing instructions, which when executed by the processor, configure the computing machine to:

classify a source colour image showing a colour of an item of interest to indicate a strength of a representation of the colour in the source colour image, wherein to classify uses a deep learning network model to extract image features with which to determine the strength and provide a classification, the source colour image being a swatch image of a makeup product applied to a background object and having varying intensity;

extract colour information from the source colour image, responsive to the classification, by clustering pixels of the source colour image in accordance with respective colours of the pixels and independent of intensity in the source colour image, and identify at least one candidate colour as the extracted colour in response to the clustering of the pixels, wherein a number of clusters k from which to determine the at least one candidate colour is defined in response to the classifying of the strength; and provide the extracted colour to define a new image using image processing, the image processing using the extracted colour to simulate the colour of the item of interest in the new image.

14. The computing machine of claim 13, wherein to classify performs a cluster-based classification that:

measures an image feature vector for the source colour image produced by the deep learning network model against a plurality of image feature clusters; and provides, as a classification of the source colour image, a respective class associated with one of the plurality of image feature clusters that is nearest to the image feature vector for the source colour image, the respective class indicating the strength of representation of colour.

15. The computing machine of claim 14, wherein the item of interest is a product and the source colour image comprises a product swatch image advertising the product and wherein the extracted color is applied to a region of the new image to by a virtual try-on application to simulate a product.

16. The method of claim 1, wherein the number of clusters k for a classification that strongly represents the colour is less than the number of clusters k for a classification that weakly represents the colour.

17. The computing machine of claim 13, wherein the number of clusters k for a classification that strongly represents the colour is less than the number of clusters k for a classification that weakly represents the colour.

18. The method of claim 1, wherein the classifying classifies the strength to one of:

a first class indicating the source colour image strongly represents the colour;

a second class indicating the source colour image weakly represents the colour; or a third class indicating to ignore the source colour image; and wherein the method performs the extracting of the colour information responsive only to the classifying of the strength to the first class or the second class.

19. The computing machine of claim 1, wherein to classify classifies the strength to one of:

a first class indicating the source colour image strongly represents the colour;

a second class indicating the source colour image weakly represents the colour; or a third class indicating to ignore the source colour image; and wherein the instructions configure the processor to extract the colour information responsive only to the classifying of the strength to the first class or the second class.

\* \* \* \* \*